(12) United States Patent
Carter et al.

(10) Patent No.: US 8,010,246 B2
(45) Date of Patent: Aug. 30, 2011

(54) LOCOMOTIVE AIR/VACUUM CONTROL SYSTEM

(75) Inventors: Robert Carter, Arkport, NY (US); Brian Cameron, Potsdam, NY (US); Vincent S. Guarrera, Jr., Watertown, NY (US); John Reynolds, Carthage, NY (US); Jon Marra, Henderson, NY (US)

(73) Assignee: New York Air Brake Corporation, Watertown, NY (US)

(*) Notice: Subject to any disclaimer, the term of this patent is extended or adjusted under 35 U.S.C. 154(b) by 868 days.

(21) Appl. No.: 12/031,090

(22) Filed: Feb. 14, 2008

(65) Prior Publication Data

US 2009/0210106 A1    Aug. 20, 2009

(51) Int. Cl.
*B61C 15/00*    (2006.01)
(52) U.S. Cl. .......................... 701/20; 303/124
(58) Field of Classification Search ............. 701/20; 303/7, 15, 20, 3, 8, 12, 127, 139, 6.1, 27, 303/128, 124, 125; 246/189
See application file for complete search history.

(56) References Cited

U.S. PATENT DOCUMENTS

| | | | |
|---|---|---|---|
| 4,125,292 A | 11/1978 | Worbois et al. | |
| 4,850,652 A | 7/1989 | Dumas et al. | |
| 5,172,316 A | 12/1992 | Root et al. | |
| 6,036,284 A | 3/2000 | Pettit et al. | |
| 6,238,010 B1 | 5/2001 | Barber et al. | |
| 6,318,811 B1 | 11/2001 | Root et al. | |
| 6,401,015 B1 * | 6/2002 | Stewart et al. | 701/19 |
| 6,941,218 B2 * | 9/2005 | Wolf et al. | 701/112 |
| 6,964,456 B2 | 11/2005 | Root | |

\* cited by examiner

*Primary Examiner* — Dalena Tran
(74) *Attorney, Agent, or Firm* — Barnes & Thornburg LLP

(57) ABSTRACT

The present locomotive brake control system includes a vacuum relay valve responsive to air brake apply and release signals on the air brake pipe to provide vacuum brake apply and release signals on a vacuum brake pipe. A locomotive brake controller is responsive to the brake apply and release signals on the air brake pipe to control the brake cylinder to apply and release the locomotive brakes in an air mode, and is responsive to the brake apply and release signals on the vacuum brake pipe sensed by a transducer to control the brake cylinder to apply and release the locomotive brakes in a vacuum mode.

10 Claims, 2 Drawing Sheets

LOCOMOTIVE AIR/VACUUM CONTROL SYSTEM

BACKGROUND AND SUMMARY

The present disclosure relates to vacuum brake systems and more specifically to an interface between an air brake system and a vacuum brake system.

Electronic control systems are used to control brakes on locomotive/s and the attached train using an air brake system. The typical air brake system uses a single pressurized air pipe brake pipe, (ABP) to control the train and control the automatic air brake on the locomotive from pressure changes in air brake pipe ABP. The air brake pipe ABP is controlled directly by the locomotive electronic brake systems system. The CCB system from New York Air Brake Corporation is an example of such a locomotive electronic brake system.

Many trains in some countries use a vacuum brake system, in which a vacuum brake pipe (VBP) is used to control the brakes in the train. The brakes on the train are released by creating a vacuum in the vacuum brake pipe VBP and are applied by venting the vacuum brake pipe VBP to atmosphere. Brake cylinders on the train, directly connected to the VBP, use atmospheric pressure to apply the brakes when the vacuum brake pipe VBP is vented to atmosphere. For an atmospheric pressure of 1013 mbar (30 inches Hg, sea level), the vacuum brake pipe VBP is usually exhausted to a pressure of 640 mbar (19 inches Hg). At higher altitudes greater than 1500 m above MSL, it maybe less. On each train the lead locomotive has a pneumatic vacuum relay valve to control the vacuum brake pipe VBP in response to the air brake pipe ABP. There is no emergency condition with vacuum brakes, but they can achieve rapid response to an emergency condition if the driver's brake valve is used to cause an emergency condition on the air brake pipe ABP.

With the updating of locomotive air brake systems to replace pneumatic locomotive brake controllers with electronic-pneumatic brake controllers, a number of pneumatic devices have been eliminated. In order to achieve the results with vacuum brakes, this requires a new interface between an air brake system and a vacuum brake system.

The present locomotive brake control system includes an air brake pipe, a vacuum brake pipe, a compressed air source, a vacuum source, and air brake cylinders for applying and releasing brakes on the locomotive. When vacuum mode is selected, a vacuum brake pipe transducer senses brake apply and release signals on the vacuum brake pipe and thereby transfer the control of air brakes on the locomotive from responding to air brake pipe ABP (in air brake mode) to responding to the vacuum brake pipe VBP when in vacuum mode.

By using the VBP pipe to control the locomotive brakes when in vacuum mode, the venting of vacuum from the VBP by a break-in-two of the VBP will also automatically apply the brakes on the locomotive. Another reason is that use of the VBP provides braking on the locomotive that is responding to the same brake command as that on the train, i.e. the VBP.

There is no separate vacuum brake controller for the vacuum relay valve; the same control equipment is used in vacuum mode as that used in air brake modes. The only difference is that the locomotive brake cylinder command will be developed in response to the VBP instead of the ABP. Dynamic brake interlocks, bail and Independent control work exactly the same as in air brake modes.

These and other aspects of the present disclosure will become apparent from the following detailed description of the disclosure, when considered in conjunction with accompanying drawings.

DETAILED DESCRIPTION OF THE PREFERRED EMBODIMENTS

Figure 1:
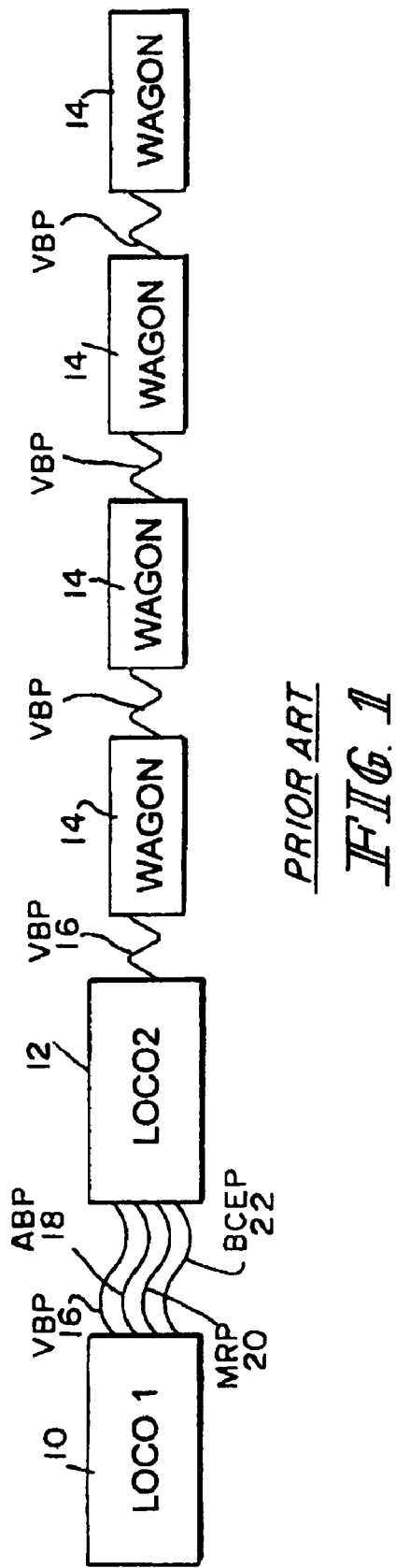
FIG. 1 shows a vacuum brake train with dual mode locomotives of the prior art.
Figure 2:
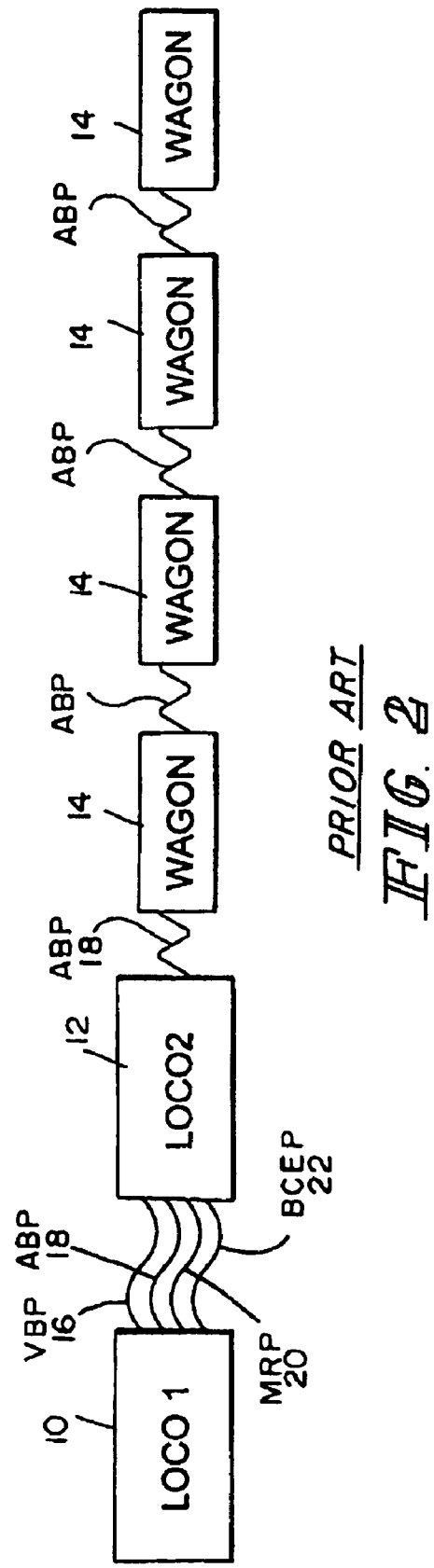
FIG. 2 shows an air brake train with dual mode locomotives of the prior art.

FIGS. 1 and 2 show a vacuum brake train and an air brake train with dual mode locomotives, respectively. Locomotives 10 and 12 are interconnected to each other and with the cars or wagons 14 by a brake pipe. The locomotives are interconnected by a vacuum brake pipe VBP 16, an air brake pipe ABP 18, a main reservoir pipe MRP 20 and a brake cylinder equalization pipe BCEP 22. The last locomotive in FIG. 1 is connected to the cars by vacuum brake pipe VBP 16 which extends through all the cars. In FIG. 2, the last locomotive 12 is connected to the cars 14 by a continuous air brake pipe ABP 18. Each of the locomotives 10 and 12 has the ability to operate in either an air brake mode or a vacuum brake mode.

As is also well known, the locomotives have a lead and trail mode and one of the locomotives is in a lead mode and the other locomotives are in a trail mode. For ease of discussion, locomotive 10 will be in the lead mode and locomotive 12 will be in the trail mode. In FIG. 1, only the locomotive in lead mode has a vacuum relay valve in use to control the VBP 16 in response to the ABP 18. The vacuum relay valve in the trail locomotive will be isolated by a manual cut-out cock. In FIG. 2, the air brake is in use and both locomotives have the vacuum relay valves isolated.

In the vacuum brake mode, the lead locomotive 10 provides the brake apply and brake release signals on the ABP 18 and the BCEP 22. A vacuum relay valve provides the brake apply and brake release signals on the VBP 16 in response to the pressure in the ABP 18. The lead locomotive 10 controls its brakes in response to the brake apply and brake release signals or pressure changes on the VBP 16, and the trail locomotive 12 controls its brake based on the brake apply and brake release signals on the BCEP 22. In FIG. 1, the wagons or cars 14 apply and release their brakes based on brake control signals on the VBP 16.

In the air brake mode, the lead locomotive 10 and the trail locomotive brake systems work the same way. The vacuum relay valve is isolated on each locomotive. The lead locomotive 10 controls its brakes in response to the brake apply and brake release signals on the ABP 18 and the trail locomotive 12 controls its brake based on the brake apply and brake release signals on the BCEP 22. The difference in FIG. 2 is that the wagons or cars 14 apply and release their brakes based on brake control signals on the ABP 18.

Figure 3:
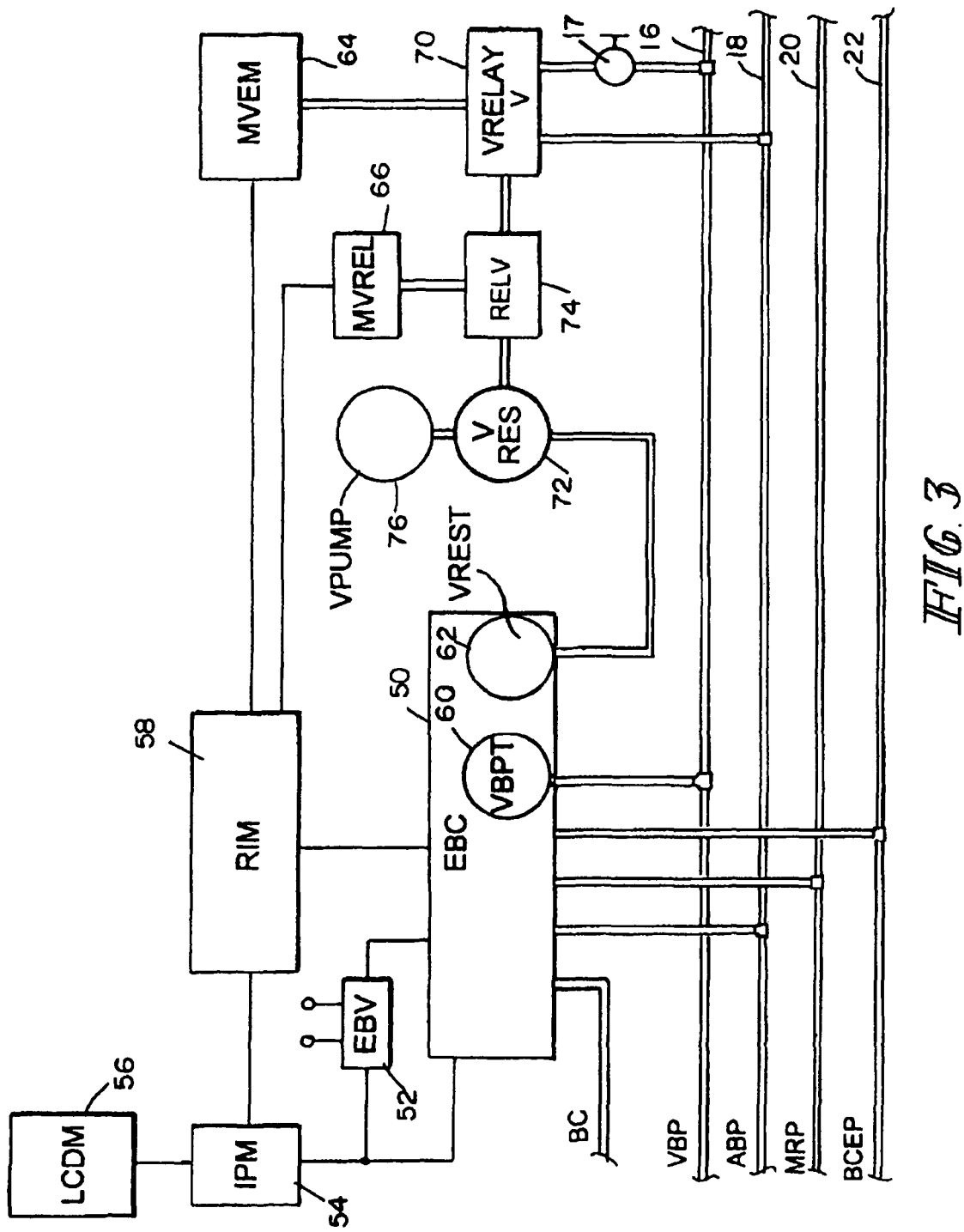
FIG. 3 is schematic of a locomotive brake control system according to the present disclosure.

A locomotive brake control system of the present disclosure is illustrated in FIG. 3. The electrical interconnections are shown by a single thin line and the pneumatic connections are shown by a double or thicker line. A locomotive electronic brake controller EBC 50 is connected to the brake cylinders BC (eight or twelve per locomotive), air brake pipe ABP 18, the main reservoir pipe MRP 20 and the brake cylinder equalization pipe BCEP 22. This is a standard connection. An electric brake valve EBV 52 is connected to the locomotive brake controller 50. An integrated processor module IPM 54 is connected to the locomotive electronic brake controller 50. A locomotive control display module LCDM 56 communicates with the IPM 54. The IPM 54 is also connected to the relay interface module RIM 58 which also communicates with the electronic brake controller 50. Those elements of FIG. 3 which have been described are part of a standard locomotive brake controller and are explained in greater detail in U.S. Pat. Nos. 6,036,284 and 5,172,316. An example is a CCB brake system available from New York Air Brake Corporation. In the '284 patent the locomotive brake controller 50 is shown as the EPCU.

The existing pneumatic control elements for the VBP 16 include the vacuum relay valve 70, the vacuum reservoir 72, the release valve 74, vacuum pump or exhauster 76 and cut-out cock 78. The relay valve 70 is known in the industry as a VA-1-B control valve and the release valve 74 s the VA-1 release valve. The vacuum relay valve 70 is responsive to pressure in the ABP and from the release valve 74 to control the vacuum in VBP 16 using the vacuum reservoir 72 and atmosphere.

A vacuum transducer 60 is connected to the vacuum brake pipe VBP 16. A second transducer 62 is connected to the vacuum reservoir pipe connected to the vacuum reservoir 72. In air brake mode, the signals from these transducers are ignored. In vacuum mode, the VBP signal is used to calculate the locomotive brake cylinder pressure according to the activity in the VBP 16 by the locomotive electronic brake controller 50. The vacuum reservoir signal is only used to display the vacuum reading on the LCDM 56.

In the vacuum mode, the locomotive electronic brake controller 50 calculates the required brake cylinder pressure on the locomotive in response to the pressure in the vacuum brake pipe VBP 16 and sends the appropriate command signals to the control the locomotive brakes BC. Thus, the locomotive brakes are controlled in response to the VBP signal as is the rest of the train. This assures that if any cars in the train should be separated, the locomotive will automatically apply brakes in the same way as applied by the remaining cars of the train. As stated before, the ABP 18 controls the VBP 16 by means of the existing vacuum relay valve 70. The VBP 16 is never used to control the ABP 18.

In air brake mode, the exact same method of control is used as the prior art of FIG. 2. The locomotive electronic brake controller 50 calculates the required brake cylinder pressure on the locomotive in response to the pressure in the air brake pipe ABP 18 and sends the appropriate command signals to the control the locomotive brakes BC.

A vacuum emergency magnet valve MVEM 64 has been added to the system and is connected to the relay interface module RIM 58. This magnet valve 64 is used to rapidly force the vacuum relay valve 70 to the "apply" position for an emergency condition. The purpose of the vacuum emergency valve 64 is to cause rapid venting of the VBP 16 for emergency conditions of the air brake pipe ABP 18. This emergency condition in the ABP may be caused by a brake in-two of the consist between adjacent locomotives or by operation of driver's brake valve EBV 52. There are also other safety measures within the locomotive brake controller 50 which would produce an emergency brake on the air brake pipe ABP 18.

A brake in-two or an emergency condition on the air brake pipe ABP 18 may be distinguished from a full service signal on the vacuum brake pipe VBP 16. For example, for an emergency condition on the air brake pipe ABP 18, a full emergency pressure will be commanded by the locomotive brakes. For a brake in-two of the vacuum brake pipe between adjacent cars, the locomotive brakes will be command a full service application instead of an emergency application.

In the existing pneumatic vacuum system, the recharging of the vacuum brake pipe VBP to produce a release includes a pneumatic timer. This timer actuates a release valve 74) to increase the amount of vacuum in order to evacuate the VBP more rapidly, thus reducing brake release time The changes to the electronic system to add the vacuum function includes the addition of a vacuum release valve MVREL 66 controlled by the RIM 58. The IPM 54 commands the RIM 58 to turn on the MVREL 66 when it detects a rise in the pressure of the ABP 18 signifying a release. The length of the "On" time will vary depending on the amount of rise in the ABP 18. Any reduction of pressure in the air brake pipe ABP 18 will terminate the release period. When the MVREL 66 is energized, it pilots "on" an existing pneumatic release valve 74 that vastly increases the amount of vacuum supply between the vacuum relay valve 70 and the exhauster.

The locomotive brake system includes the locomotive control display module LCDM 56 which normally shows information relating to the air brakes and other locomotive functions. The display also has the capability of displaying information about the vacuum brake system. When the vacuum mode is selected, the vacuum information is displayed. This would include display of the pressure in the vacuum brake pipe VBP 16 as well as monitored by transducer 60, and also the vacuum reservoir monitored by vacuum reservoir transducer 62.

The locomotive control system currently has the ability of selecting the modes of air brake, lead, trail, passenger or freight. For operation of the vacuum brake, a vacuum brake mode is added. Vacuum brake control is only used in a lead mode, and is used for both passenger and freight trains, with graduated release of the air and vacuum brake pipes. Direct release is normally used for freight air brake systems. Graduated release is used for passenger trains. The control logic of the locomotive electronic brake control 50 would also incorporate interlocks to insure that the vacuum mode is only available for appropriate operating conditions. For example, the vacuum mode would not be used in electronically controlled pneumatic (ECP) brake or distributed power (DP) modes. The locomotive brake control system can monitor, log and display the status of the EBC 50 and IPM 54.

Thus, as can be seen by adding two transducers 60 and 62, two electro-pneumatic valves, namely, the vacuum emergency valve 64 and the vacuum release valve 66, control and operation of vacuum brakes is achieved with an electronic locomotive brake system.

Although the present disclosure has been described and illustrated in detail, it is to be clearly understood that this is done by way of illustration and example only and is not be taken by way of limitation. The scope of the present disclosure is to be limited only by the terms of the appended claims.

What is claimed:

1. A locomotive brake control system comprising:
    an air brake pipe, a vacuum brake pipe, a pressurized air source, a vacuum source, and a brake cylinder for applying and releasing brakes on the locomotive;
    a vacuum relay valve responsive to brake apply and release signals on the air brake pipe to provide vacuum brake apply and release signals on the vacuum brake pipe;
    a vacuum brake pipe transducer sensing pressure in the vacuum brake pipe;
    a locomotive brake controller responsive to the brake apply and release signals on the air brake pipe to control the brake cylinder to apply and release the locomotive brakes in an air mode, and responsive to the brake apply and release signals from the vacuum brake pipe transducer to control the brake cylinder to apply and release the locomotive brakes in a vacuum mode.

2. The system according to claim 1, wherein in the vacuum mode, the locomotive brake controller, in response to an emergency condition, activates the brake cylinder to apply the locomotive brakes and provides an emergency brake apply signal to the vacuum relay valve.

3. The system according to claim 2, including a first electro-pneumatic valve for selectively providing the emergency brake apply signal to the vacuum relay valve and wherein the locomotive brake controller, in response to the emergency condition, controls the first electro-pneumatic valve to provide the emergency brake apply signal to the vacuum relay valve.

4. The system according to claim 1, wherein in the vacuum mode, the locomotive brake controller, in response to the air brake release signal on the air brake pipe, provides a first release signal to the vacuum relay valve.

5. The system according to claim 4, wherein in the vacuum mode, the locomotive brake controller provides the first release signal to the vacuum relay valve for a predetermined time.

6. The system according to claim 4, wherein in the vacuum mode, the locomotive brake controller provides the first release signal to the vacuum relay valve independent of the vacuum brake controller's response to an air brake release signal on the air bake pipe.

7. The system according to claim 4, including a release valve; and wherein the locomotive brake controller provides the first release signal to the release valve and the release valve provides a second release signal to the vacuum relay valve.

8. The system according to claim 7, including a second electro-pneumatic valve, controlled by the locomotive brake controller, for providing the first release signal.

9. The system according to claim 4, including a second electro-pneumatic valve, controlled by the locomotive brake controller, for providing the first release signal.

10. The system according to claim 1, wherein the locomotive brake controller has a lead and trail mode, and in the lead mode, the locomotive controller provides the air brake apply and release signals on the air brake pipe.

\* \* \* \* \*